(12) United States Patent
Lee

(10) Patent No.: US 7,425,780 B2
(45) Date of Patent: Sep. 16, 2008

(54) SAFETY INTERFACE SYSTEM

(75) Inventor: Timothy L. Lee, Bloomington, IL (US)

(73) Assignee: Lee Environmental Technologies, Inc., Bloomington, IL (US)

( * ) Notice: Subject to any disclaimer, the term of this patent is extended or adjusted under 35 U.S.C. 154(b) by 116 days.

(21) Appl. No.: 11/261,332

(22) Filed: Oct. 27, 2005

(65) Prior Publication Data

US 2006/0109594 A1    May 25, 2006

Related U.S. Application Data

(60) Provisional application No. 60/623,090, filed on Oct. 27, 2004.

(51) Int. Cl.
*H02J 3/00*    (2006.01)
(52) U.S. Cl. ........................................ 307/83
(58) Field of Classification Search .................. 361/43; 323/361; 307/83
See application file for complete search history.

(56) References Cited

U.S. PATENT DOCUMENTS

| | | | | |
|---|---|---|---|---|
| 4,473,817 A | * | 9/1984 | Perkins ........................... | 307/3 |
| 4,669,037 A | * | 5/1987 | Bobry ........................... | 363/24 |
| 4,968,949 A | * | 11/1990 | Torrano et al. ............... | 330/188 |
| 5,420,551 A | * | 5/1995 | Conte et al. .................... | 333/12 |
| 6,060,876 A | * | 5/2000 | Glasband et al. ............. | 323/355 |
| 6,108,180 A | * | 8/2000 | Severino et al. ................ | 361/42 |
| 7,026,727 B2 | * | 4/2006 | Readio et al. .................. | 307/83 |
| 7,149,096 B2 | * | 12/2006 | Batarseh et al. ............... | 363/16 |

OTHER PUBLICATIONS

Taylor, William T. Stationary Transformers, 1909, McGraw Publishing Company, New York.*
Opinion and Search Report for PCT/US05/38890.

* cited by examiner

*Primary Examiner*—Michael J Sherry
*Assistant Examiner*—Christopher J Clark
(74) *Attorney, Agent, or Firm*—Brinks Hofer Gilson & Lione

(57) ABSTRACT

A symmetrical power system is provided that supplies a symmetrical power at an output power supply. The symmetrical power system comprises a first transformer and a second transformer which have identical transformer properties. The first and second transformers are each separately in communication with one of a first and second phase of an input power supply via corresponding first primary windings, and each separately in communication with one of a first and second phase of the output power supply via corresponding first secondary windings. The first and second transformers are connected in parallel between a input common conductor of the input power supply via corresponding second primary windings and an output common conductor connected the output power supply via corresponding second secondary windings. The first and second phases of the output power supply are inversely phased.

9 Claims, 3 Drawing Sheets

SAFETY INTERFACE SYSTEM

This application claims priority to and the benefit of U.S. Provisional Application No. 60/623,090, filed Oct. 27, 2004, which is hereby incorporated by reference.

BACKGROUND

According to the U.S. Department of Labor and Occupational Safety & Health Administration (OSHA), each year there are approximately 10,000 incidents of accidental electric shock. While not all electrocutions are fatal, about 9% or approximately 900 are. This statistic does not include the many thousands of unreported accidental electric incidents. By the time they reach adulthood, most people have been accidentally shocked by accidentally touching an electrically charged wire, a faulty light switch, a faulty lamp, plugging in an electrical device in a damp environment or from ground fault situation. Electrical shock is not only an uncomfortable experience, but it may also cause very painful burns or even death.

Ground fault interrupters (GFI) or ground fault circuit interrupters (GFCI) are designed to protect from electrical shock by interrupting a circuit when there is a difference in the currents in the "hot" and neutral wires. Such a difference indicates that an abnormal diversion of current from the "hot" wire is occurring. Such a current might be flowing in the ground wire, such as a leakage current from a motor or from capacitors. More importantly, that current diversion may be occurring because a person has come into contact with the "hot" wire and is being shocked. When a circuit is functioning normally, all of the return current from an appliance flows through the neutral wire, so the presence of a difference between "hot" and neutral currents represents a malfunction which in some circumstances could produce a dangerous or even lethal shock hazard.

Because of the great sensitivity of the detection of current differences, GFIs are prone to nuisance tripping in certain applications. A rather common practice in some areas is to have a freezer on the carport, and carport receptacles are sometimes wired with GFIs. Under moist conditions you can sometimes get enough leakage current to trip the GFI, and persons come back to find their freezer thawed out. A necessary safety precaution in bathrooms and near pools, they are sometimes quite troublesome in outdoor applications where reliable power is needed.

Moreover, the protective circuitry in a GFI is vulnerable to voltage spikes such as those caused by lightning and high-voltage switching. Thus, the GFI may eventually fail to provide ground-fault protection while still providing power for tools and appliances. With the wide use of portable tools on construction sites, the use of flexible cords often becomes necessary. Hazards are created when cords, cord connectors, receptacles, and cord-connected equipment are improperly used and maintained. Generally, flexible cords are more vulnerable to damage than is fixed wiring. A flexible cord may be damaged by activities on the job, by door or window edges, by staples or fastenings, by abrasion from adjacent materials, or simply by aging. If the electrical conductors of the flexible cord become exposed, and the GFI fails to provide ground-fault protection there is a danger of shocks, burns, or fire. A frequent hazard on a construction site is a cord assembly with improperly connected terminals.

When a cord connector is wet, hazardous leakage can occur to the equipment grounding conductor and to humans who pick up that connector if they also provide a path to ground. Such leakage is not limited to the face of the connector but also develops at any wetted portion of it. Typically, when the leakage current of tools is below 1 ampere, and the grounding conductor has a low resistance, no shock should be perceived. However, when the resistance of the equipment grounding conductor increase, the current through the body may also increase. Thus, if the resistance of the equipment grounding conductor is significantly greater than 1 ohm, tools with even small leakages become hazardous. Such dangerous situations may also occur if an electric motor, used in irrigation for example, is suddenly immersed in several inches of water and the GFI fails to provide ground-fault protection, then a worker coming into contact with the motor or the water source would be shocked, possibly fatally, and the motor would stop functioning.

Accordingly, there is a need for addressing the problems noted above and others previously experienced.

SUMMARY

The present invention is defined by the appended claims. This description summarizes some aspects of the present embodiments and should not be used to limit the claims.

A symmetrical power system is provided that supplies a symmetrical power at an output power supply. The symmetrical power system comprises a first transformer and a second transformer which have identical transformer properties. The first and second transformers are each separately in communication with one of a first and second phase of an input power supply via corresponding first primary windings, and each separately in communication with one of a first and second phase of the output power supply via corresponding first secondary windings. The first and second transformers are connected in parallel between a input common conductor of the input power supply via corresponding second primary windings and an output common conductor connected the output power supply via corresponding second secondary windings. The first and second phases of the output power supply are inversely phased.

In an advantageous feature, the first and second transformers are isolation transformers. In a further advantageous feature the isolation transformers are control transformers.

In another advantageous feature, the first and second primary windings of each of the first and second transformers are connected in parallel, and first and second secondary windings of each of the first and second transformers are connected in parallel.

In another advantageous feature, both common conductors are isolated from ground at both the input power supply and the output power supply.

Figure 1:
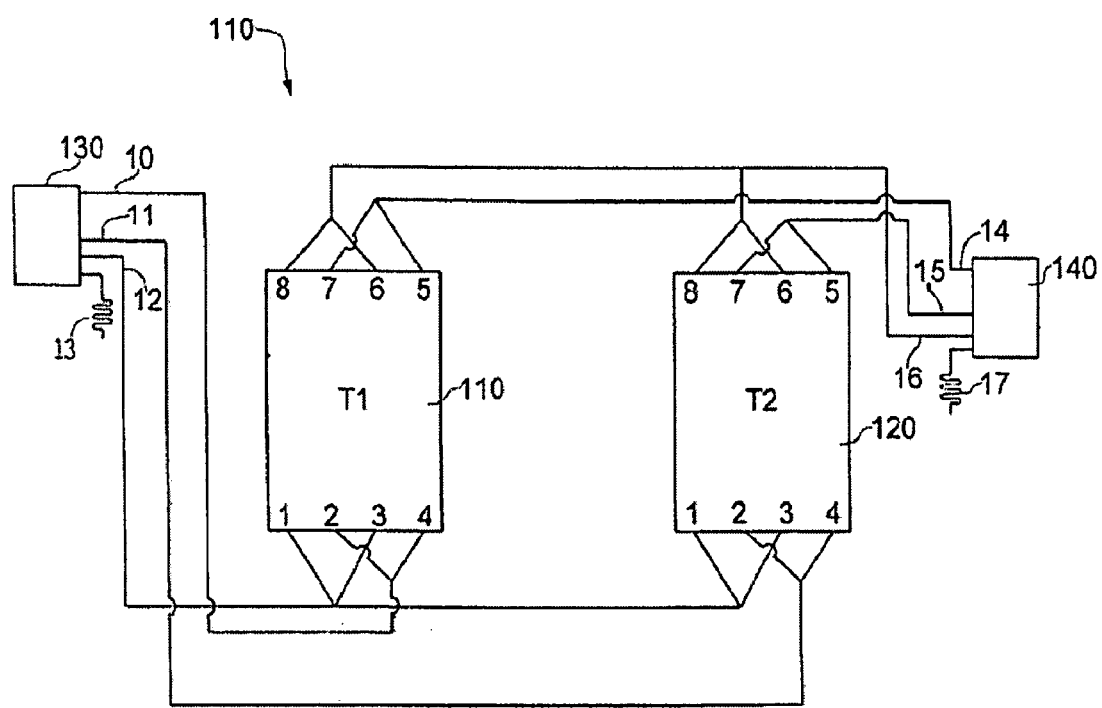
FIG. 1 is a schematic diagram illustrating a safety interface system.

Illustrative and exemplary embodiments of the invention are described in further detail below with reference to and in conjunction with the figures.

In the drawings, identical reference numbers identify identical or substantially similar elements or acts. To easily identify the discussion of any particular element or act, the most significant digit or digits in a reference number refer to the Figure number in which that element is first introduced.

A portion of this disclosure contains material to which a claim for copyright is made. The copyright owner has no objection to the facsimile reproduction by anyone of the patent document or the patent disclosure (including Figures), as it appears in the Patent and Trademark Office patent file or records, but reserves all other copyright rights whatsoever.

DETAILED DESCRIPTION OF THE DRAWINGS

The present invention is defined by the appended claims. This description summarizes some aspects of the present embodiments and should not be used to limit the claims.

While the present invention may be embodied in various forms, there is shown in the drawings and will hereinafter be described some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a and an" object is intended to denote also one of a possible plurality of such objects.

Turning now to the drawings, and particularly to FIG. 1, an example of an safety interface system (SIS) is shown in FIG. 1. The SIS 100 may include a pair of transformers T1 110 and T2 120. The transformers T1 and T2 110, 120 may be connected between an input power supply 130 and an output power supply 140. Devices requiring electrical power, such as machines, may be connected and powered by the output power supply 140. Both the first and second transformers T1 and T2 110 and 120, respectively, may include two pairs of inputs 1, 2, 3 and 4 and two pairs of outputs 5, 6, 7, and 8.

The input power supply 130 may include ports supplying a first phase 10, a second phase 11, a common (or neutral) 12, and a ground 13. The first phase 10 may be in communication with one of the two pairs of primary inputs 2 and 4 of the first transformer T1 110. The second phase 11 may be in communication with one of the two pairs of primary inputs 2 and 4 of the second transformer T2 120. The common 12 may be in parallel communication with the other of the two pairs of primary inputs 1 and 3 of both the first and second transformers T1 and T2 110 and 120, respectively. The common 12 and the ground 13 may be isolated from each other.

The output power supply 140 may include ports for receiving a first output phase 14, a second output phase 15, an output common (or neutral) 16, and an output ground 17. The first output phase 14 may be in communication with one of the two pairs of secondary outputs 5 and 7 of the first transformer T1 110. The second output phase 15 may be in communication with the other of the two pairs of secondary outputs 5 and 7 of the second transformer T2 120. The output common 16 may be in parallel communication with the other of the two pairs of secondary outputs 6 and 8 of both the first and second transformers T1 and T2 110 and 120, respectively. The common 16 and the ground 17 may be isolated from each other. The grounds 13 and 17 of both the input and output power supplies 130, 140, respectively, may be coupled to the same ground.

Figure 2:
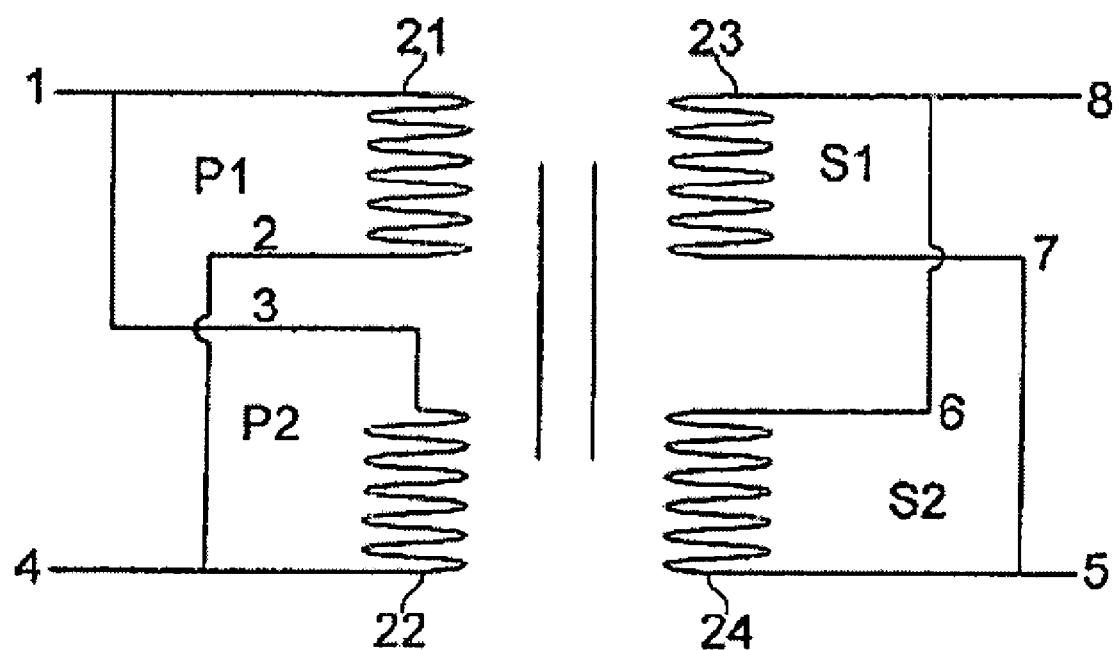
FIG. 2 is a schematic diagram of a transformer windings used in the safety interface system of FIG. 1.

Now referring to FIG. 2, a schematic diagram of transformer windings used in the safety interface system of FIG. 1 is shown. For the sake of simplicity, only one set of primary and secondary transformer windings is shown and will be discussed, for example, the windings of transformer T1 110. In FIG. 2, the transformer T1 110 includes a pair of primary winding or coils P1 21 and P2 22, and a pair of secondary windings S1 23 and S2 24. As shown, ends of primary winding P1 21 are each connected to primary inputs 1 and 2 of the first transformer T1 110. Ends of primary winding P2 22 are each connected to primary inputs 3 and 4 of the first transformer T1 110. Similarly, ends of secondary winding S1 23 are each connected to secondary outputs 7 and 8 of the first transformer T1 110. Ends of secondary winding S2 24 are each connected to secondary outputs 5 and 6 of the first transformer T1 110. Both the pair of primary windings P1 21 and P2 22 and the pair of secondary windings S1 23 and S2 24 are shown connected in parallel. As such, primary inputs 1 and 3 are electrically connected, as well as primary inputs 2 and 4. Similarly, secondary outputs 5 and 7 are electrically connected, as well as secondary outputs 6 and 8.

Based on the above described wiring arrangement and as shown in FIG. 1, the transformers T1 110 and T2 120 are connected in parallel between input common 12 and output common 16. Moreover, the transformer T1 110 is connected in series between corresponding first input phase 10 and first output phase 14. Similarly, the transformer T2 120 is connected in series between corresponding second input phase 11 and second output phase 15.

In operation, ac input signals of 110 volts, for example, are applied to both transformers T1 110 and T2 120 through corresponding primary inputs 2 and 4 via first input phase 10 and second input phase 11, while the common 12 is in parallel communication with the other of the two pairs of primary inputs 1 and 3 of both the first and second transformers T1 and T2 110 and 120. Without loss of generality, windings P1 21, P2 22, S1 23, and S4 24 have identical number of winding turns, which provide a 1 to 1 ratio between the primary windings and the secondary windings. Accordingly, these 110 volts ac input signals may induce the secondary windings of both transformers T1 110 and T2 120 to substantially produce 110 volts ac output signals outputs at their respective secondary outputs 5 and 7.

The ac input signals of 110 volts, applied to both transformers T1 110 and T2 120 through corresponding primary inputs 2 and 4 via first input phase 10 and second input phase 11, may originate from typical sources such a power grid and thus may not be balanced. These ac input signals of 110 volts may form a voltage potential of 220 volts between input phase 10 and second input phase 11.

Since transformers T1 110 and T2 120 are connected in parallel between input common 12 and output common 16, thus transformers T1 110 and T2 120 are connected to the same output common 16. Accordingly, the secondary outputs 6 and 8 of both transformers T1 110 and T2 120 are connected to each other, thereby forming a central tap between the two transformers outputs, namely corresponding secondary outputs 5 and 7. Consequently, ac output signals provided by transformers T1 110 and T2 110 at corresponding secondary outputs 5 and 7 are equal in magnitude and opposite in phase.

Figure 3:
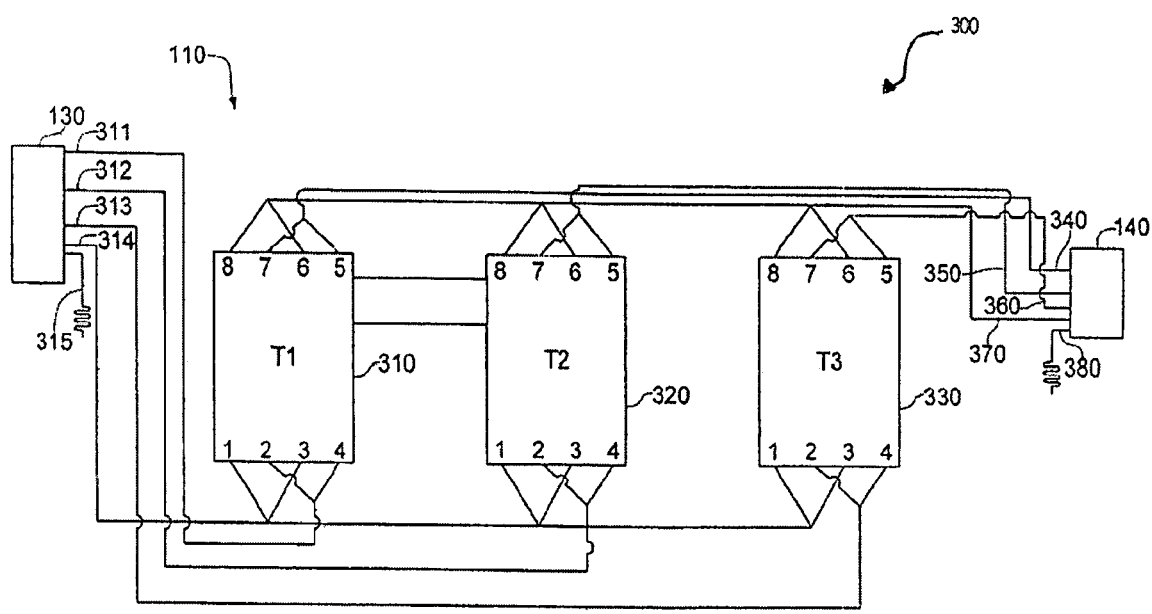
FIG. 3 is a schematic diagram of a three-phase safety interface system.

Now referring to FIG. 3, another example of a safety interface system (SIS) is shown. The SIS 300 may include three transformers T1 310, T2 320, and T3 330. The transformers T1, T2, and T3 310, 320 and 330 may be connected between an input power supply 130 and an output power supply 140. All three transformers T1, T2, and T3 310, 320 and 330 may include two pairs of inputs 1,2,3 and 4 and two pairs of outputs 5, 6, 7, and 8.

The input power supply 130 may include ports supplying a first phase 311, a second phase 312, a third phase 313, a common (or neutral) 314, and a ground 315. The first phase 311 may be in communication with one of the two pairs of primary inputs 2 and 4 of the first transformer T1 310. The second phase 312 may be in communication with one of the two pairs of primary inputs 2 and 4 of the second transformer T2 320. The third phase 313 may be in communication with one of the two pairs of primary inputs 2 and 4 of the third transformer T3 330. The common 314 may be in parallel communication with the other of the two pairs of primary inputs 1 and 3 of all three transformers T1, T2, and T3 310, 320 and 330, respectively. The common 314 and the ground 315 may be isolated from each other.

The output power supply 140 may include ports for receiving a first output phase 340, a second output phase 350, a third phase 360, an output common (or neutral) 370, and an output ground 380. The first output phase 340 may be in communication with one of the two pairs of secondary outputs 5 and 7 of the first transformer T1 310. The second output phase 350 may be in communication with the other of the two pairs of secondary outputs 5 and 7 of the second transformer T2 320. The third output phase 360 may be in communication with the other of the two pairs of secondary outputs 5 and 7 of the third transformer T3 360. The output common 370 may be in parallel communication with the other of the two pairs of secondary outputs 6 and 8 of all three transformers T1, T2, and T3 310, 320 and 330, respectively. The common 370 and the ground 380 may be isolated from each other. The grounds 315 and 380 of both the input and output power supplies 130, 140, respectively, may be coupled to the same ground.

Based on the above described wiring arrangement and as shown in FIG. 3, the transformers T1, T2, and T3 310, 320 and 330 are connected in parallel between input common 315 and output common 380. Moreover, the transformer T1 310 is connected in series between corresponding first input phase 311 and first output phase 340. A similar connection is provided for the other two transformers T1 320 and t2 330 between their corresponding second and third phases.

As discussed above, since transformers T1, T2, and T3 310, 320 and 330 are connected in parallel between input common 315 and output common 380, thus transformers T1, T2, and T3 310, 320 and 330 are connected to the same output common 380. Accordingly, the secondary outputs 6 and 8 of all three transformers T1, T2, and T3 310, 320 and 330 are connected to each other, thereby forming a common tap between the three transformers outputs, namely corresponding secondary outputs 5 and 7. Consequently, ac output signals provided by transformers T1, T2, and T3 310, 320 and 330 at corresponding secondary outputs 5 and 7 are equal in magnitude and out of phase by 120 degrees.

A safety interface system has been provided that minimizes or eliminates the potential for dangerous shocks, electrocution and/or electrical fires. The SIS may be designed to protect a single circuit a house or apartment or scaled-up to protect industrial applications and manufacturing plants. The SIS can be added as a retrofit or integrated into new electrical systems or technologies.

The SIS may function on alternating current (AC) voltages ranging from 1 to 600V at either 50 or 60 hertz. In addition, SIS may be used for direct current (DC) applications. Further, this technology may be scaled for use at the generating source itself. Single phase and three phase circuits are equally protected while maintaining phase relationships on each leg.

Unlike a ground fault interrupt (GFI) device, the SIS does not interrupt the electrical flow in the circuit and is fully grounded to the outside world. Instead, the exposed or electrically faulty device will continue to function. As an example, if an electric motor used in irrigation is suddenly immersed in several inches of water, a worker coming into contact with the motor or the water source would be shocked, possibly fatally, and the motor would stop functioning. If the electrical supply to this motor was supplied via the SIS, the motor could be completely immersed and would continue to function without exposing the worker to the possibility of electrical shock. The SIS may be used in agricultural settings, due to the inherent wet environment and the propensity for livestock to chew on electrical wiring. Built-in safety systems may shut down the SIS and sound alarm if any internal part failure should occur.

It is therefore intended that the foregoing detailed description be regarded as illustrative rather than limiting, and that it be understood that it is the following claims, including all equivalents, that are intended to define the spirit and scope of this invention.

The invention claimed is:

1. A symmetrical power system for providing a symmetrical power at an output power supply, comprising:
    a first transformer; and
    a second transformer,
    wherein the first and second transformers have identical transformer properties,
    wherein the first and second transformers are each separately in communication with one of a first and second phase of an input power supply via corresponding first primary windings, and each separately in communication with one of a first and second phase of the output power supply via corresponding first secondary windings,
    wherein the first and second transformers are connected in parallel between a common conductor of the input power supply via corresponding second primary windings and a common conductor of the output power supply via corresponding second secondary windings, and
    wherein the first and second phases of the output power supply are inversely phased.

2. The symmetrical power system of claim 1, wherein the first and second transformers are isolation transformers.

3. The symmetrical power system of claim 2, wherein the isolation transformers are control transformers.

4. The symmetrical power system of claim 1, wherein the first and second primary windings of each of the first and second transformers are connected in parallel, and first and second secondary windings of each of the first and second transformers are connected in parallel.

5. The symmetrical power system of claim 1, wherein both common conductors are isolated from ground at both the input power supply and the output power supply.

6. A method for providing a balanced power system, the method comprising:
    placing a first transformer in communication with one phase of an input power supply via first primary inputs, and via corresponding first secondary outputs to one phase of an output power supply;
    placing a second transformer in communication with another phase of the input power supply via first primary inputs, and via corresponding first secondary outputs to another phase of the output power supply, the second transformer having identical transformer properties as the first transformer;
    connecting the first and second transformers in parallel between a common conductor of the input power supply via corresponding second primary windings and a common conductor of the output power supply via corresponding second secondary windings; and
    isolating the common conductors from ground.

7. The method of claim 6, wherein the first and second transformers are isolation transformers.

8. The method of claim 7, wherein the isolation transformers are control transformers.

9. The method of claim 6, wherein the first and second primary windings of each of the first and second transformers are connected in parallel, and first and second secondary windings of each of the first and second transformers are connected in parallel.

* * * * *